Oct. 23, 1923.
A. E. H. PAYNE
BICYCLE AND THE LIKE
Filed Oct. 20, 1922
1,471,505
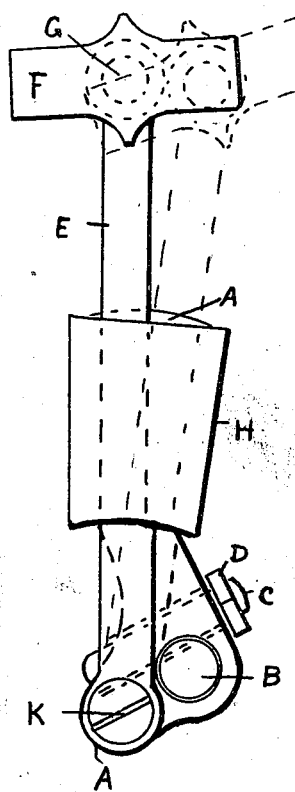
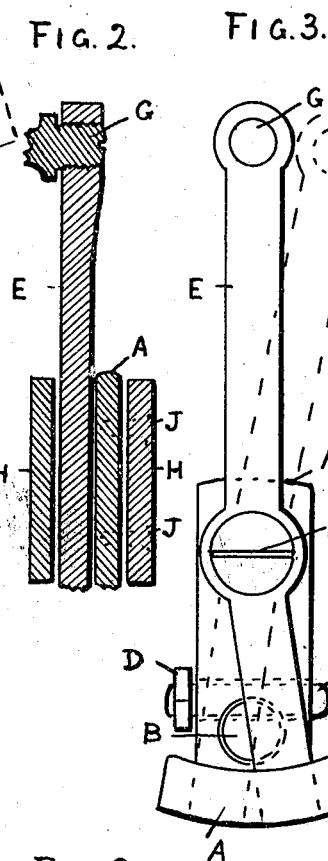
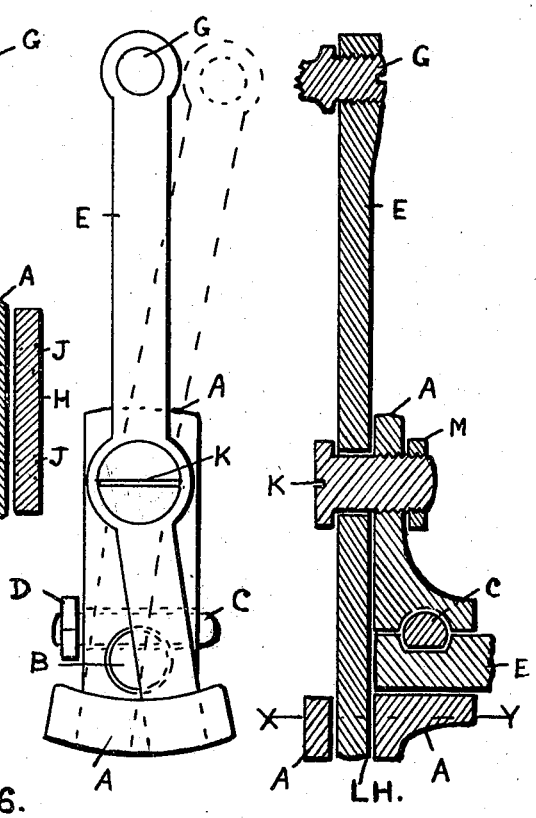
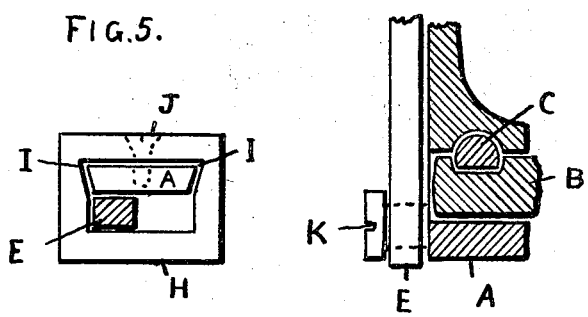
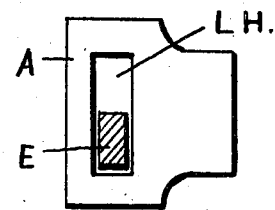
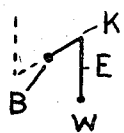
Albert. E. H. Payne.

Patented Oct. 23, 1923.

1,471,505

UNITED STATES PATENT OFFICE.

ALBERT EDWARD HORLICK PAYNE, OF KILDARE, IRELAND.

BICYCLE AND THE LIKE.

Application filed October 20, 1922. Serial No. 595,860.

*To all whom it may concern:*

Be it known that I, ALBERT EDWARD HORLICK PAYNE, contractor, a subject of His Majesty the King of Great Britain and Ireland, residing at Mons Leinster Walk, Kildare, Ireland, have invented certain new and useful Improvements in or Relating to Bicycles and the like; and I do hereby declare the following to be a full, clear, and exact description, such as will enable others skilled in the art to which it appertains to make and use the same.

This invention relates to novel improvements in or relating to bicycles and the like. While susceptible of modification (as will hereinafter appear) my invention in every case comprises means whereby the pedals of a bicycle or like propelled contrivance, are, each in turn, at the desired time, balanced to produce upset of equipoise whereby the pedal is momentarily released from the load and advanced to a position offering a better leverage; which said manner of effecting pedal advancement is the essential feature common to the several modifications.

From the foregoing it may be seen that my invention does not come within the category of devices which, in procuring advancement of the pedal, vary the throw of the crank, unless it be construed that by reason of my crank obtaining a separate leverage for the pedal when the main leverage is exhausted it should consequently be deemed to come within that definition. Be this as it may I do not here seek elongation of my main crank and the slight alteration in the length thereof would scarcely be called a variable throw, for its effect in elongation is practically nil. Subject to this explanation I disclaim variable throw.

In one of its simplest arrangements my device may assume the form of a bicycle, each pedal crank of which has two blades, the longer one holding the pedal and the other secured to the axle. These blades pivoted together and, in a sleeve, are held together against movement other than that of rocking the pedal in the direction of the cranks' rotary motion, to an extent sufficient to advance the pedal (say about one inch) at or about the moment the pedal completes its upward course; and (correspondingly) upon the return of the pedal, both the advance and return being automatic under the effects of gravitation. By placing the pin or other rocking axis connecting the two arms near the crank axle the distance of the pedal from the axle is practically unaltered by the advancement of the pedal; and (by gravitation) the movement is thereby also made more automatic.

It is obvious that the rocking axis could be arranged elsewhere (see Fig. 3, of the annexed drawings).

In one modification of the above I may shape the blades or a blade to perform the functions of the sleeve aforesaid or to limit the said rocking. In a modification of the foregoing I may vary the extent of the said rocking or advancement of the pedal.

In order that my invention may be clearly understood I will now describe the same with reference to the annexed drawings forming part of this specification wherein:

Fig. 1 shows an end view of the crank axle of a bicycle and therewith in its relation thereto—by outline of a pedal (two positions) the aforesaid pedal advancement, and also an arrangement of the pedal crank whereby to produce the same,—all in accordance with my invention. Fig. 2 is a vertical section of the upper part of the crank E and of the sleeve H shown in Fig. 1. Fig. 3 shows an arrangement in modification of the crank in Fig. 1. Fig. 4 is a vertical section of Fig. 3. Fig. 5 is a top view of the sleeve H shown in Fig. 1. Fig. 6 is a vertical section of that part of Fig. 1 as is below the said sleeve H taken central on the crank axle B and at right angles to the cotter C. Fig. 7 is a section on the line X—Y of Fig. 4. Fig. 8 is a diagram to show that when the rocking axis is rightly placed to procure the advance of the pedal at the aforesaid desired time, weight on the down pedal is beneficial leverage.

Similar letters refer to similar parts throughout the several views.

Referring to Fig. 1. Here the pedal F (that for the rider's right foot) is shown at or about the time it completes its upward course. The dotted lines being to indicate the aforesaid pedal advancement which takes place when the pedal—in the direction taken for pedalling—rises to the point where equipoise is upset over the axis K upon which at that time the pedal's blade E is balanced for that purpose. With regard to the pedal crank here shown the blade A is secured to the crank axle B by means of (known) cotter C with its nut D; and the blade E has hold of the pedal F by means of (known) expander cone G secured into a hole in E in known manner. These blades E and A have about them the sleeve H to hold them together and against movement other than that of rocking the blade E upon the pin or axis K aforesaid.

It may be seen that the sleeve H acts as a support for the blade E which it permits to lag on the upward journey until as aforesaid the pedals equipoise is upset which upset advances the pedal and in such a manner that the full use of the pedalling power is thereby instantly obtained for the downward or driving stroke. Referring to Figs. 2 and 5. Here is shown a suitable way of fixing the sleeve H to the blade A by the dovetailing I and the screws J;—and here it is convenient to point out that if this blade A was of a shape to perform the functions of the sleeve H, the double thickness of and fixing of A to H would be avoided.

Referring to Figs. 3, 4 and 7. Here is shown an arrangement of a modification of the pedal crank aforesaid. The blade E is hinged to blade A at some distance from the crank axle B and the rocking movement is limited by an extension of the blade E being confined to the space L H formed by the sleeve like extension of A. The rocking axis (similar to that in Fig. 1) is here shown as a bolt K fixed to A by the (known) threading of the one to the other and a nut M on the extended thread. In Fig. 3 the advance of the pedal is similar in all respects to that of Fig. 1 except that the advance takes place later than the aforesaid desired time by reason of this fact,—that whereas in Fig. 1 the rocking axis is well on the rider's side of a line plumb with the axle B,—here in Fig. 3 it is not but although to illustrate this point I have in Fig. 3 shown K plumb with B. I,—for the sake of obtaining leverage effect on the load at the bottom of the stroke prior to rising, similar to what is obtained in Fig. 1,—make the extension part of blade E, at an angle of about 153 degrees with the pedal carrying part of E, instead of at the 175 degrees here shown.

Referring to Fig. 8. Here B is the centre of the crank axle, and K is the centre of the rocking axis, these representing the parts bearing those letters in Fig. 1, whereby to procure the advancement of the pedal of the rider's right foot at or about the time the pedal completes its upward course, and it will be seen by blade E here inverted that the downward pressure on the pedal (here represented by W) has a lever like effect on the load (the leverage being that represented by the distance between two plumb lines the one through the centre of the axle B and the other through the centre of the axis K in Fig. 1) prior to rising. This point may be made more clear by viewing Fig. 1 with the pedal downward, and so viewed it may be seen that when the descending pedal reaches the point where the respective centres of G and K are plumb the sleeve H contains blade E in the position indicated by dotted lines, and thereafter a sufficient downward pedal pressure causes the crank axle B to yield until G is plumb with B (or thereabouts) by which time (normally) the pedal of the rider's left foot has advanced and got to work. In other words, the work of one pedal overlaps the work of the other pedal between the time of the changed sleeve position and the time of G becoming plumb with B as aforesaid.

I am aware that pedals have already been used on an arm pivoted to an arm on the crank shaft and I therefore do not claim this broadly but what I claim and desire to secure by Letters Patent of the United States is:—

1. In a bicycle or the like, a pedal crank having the pedal on an arm that is pivoted on a shorter crank arm fixed to the crank shaft so that the pedal bearing arm may rock relatively to the crank arm between limits provided by a sleeve or the equivalent without appreciably varying the throw; substantially as and for the purpose herein described and shown.

2. In a bicycle or the like, a pedal crank having the pedal on an arm that is pivoted on a shorter crank arm fixed to the crank shaft, the pivotal connection being placed adjacent to the crank shaft so that the pedal bearing arm may rock relatively to the crank arm between limits provided by a sleeve or the equivalent without appreciably varying the throw; substantially as and for the purpose herein set forth.

3. In a bicycle or the like, a pedal crank having the pedal on an arm that is pivoted on a crank arm fixed to the crank shaft, the pivotal connection so placed that at the time the driving stroke is commenced the hinge point is located on the rider's side of the crank shaft so that the pedal bearing arm may rock relatively to the crank arm between limits provided by a sleeve or the equivalent without appreciably varying the throw; substantially as and for the purpose herein set forth.

4. In a bicycle or the like, a pedal crank having the pedal at one end of an arm that has its other end hinged upon a body member fixed to the crank shaft so that at the time when the driving stroke commences the hinge point is located on the rider's side of the crank shaft so that the pedal bearing arm may rock relatively to the body member between limits provided by a sleeve or the equivalent without appreciably varying the throw; substantially as and for the purpose herein set forth.

5. In a bicycle or the like, a pedal crank having the pedal on an arm that is pivoted on a crank arm fixed to the crank shaft, the pivotal connection so placed that at the time when the driving stroke commences the hinge point is located on the rider's side of, and adjacent to, the crank shaft so that the pedal bearing arm may rock relatively to the crank arm between limits provided by a sleeve or the equivalent without appreciably varying the throw; substantially as and for the purpose herein set forth.

In testimony whereof I affix my signature.

ALBERT EDWARD HORLICK PAYNE.